United States Patent
Lavi et al.

(10) Patent No.: US 11,570,188 B2
(45) Date of Patent: Jan. 31, 2023

(54) DARK WEB MONITORING, ANALYSIS AND ALERT SYSTEM AND METHOD

(71) Applicant: Sixgill Ltd., Tel Aviv (IL)

(72) Inventors: Elad Lavi, Ramat Hakovesh (IL); Avi Kasztan, Kfar Saba (IL)

(73) Assignee: Sixgill Ltd., Tel Aviv (IL)

( * ) Notice: Subject to any disclaimer, the term of this patent is extended or adjusted under 35 U.S.C. 154(b) by 146 days.

(21) Appl. No.: 16/066,315

(22) PCT Filed: Dec. 27, 2016

(86) PCT No.: PCT/IB2016/058016
§ 371 (c)(1),
(2) Date: Jun. 27, 2018

(87) PCT Pub. No.: WO2017/115272
PCT Pub. Date: Jul. 6, 2017

(65) Prior Publication Data
US 2019/0007440 A1    Jan. 3, 2019

Related U.S. Application Data

(60) Provisional application No. 62/271,344, filed on Dec. 28, 2015.

(51) Int. Cl.
*H04L 9/40*    (2022.01)
*G06Q 50/26*    (2012.01)
(Continued)

(52) U.S. Cl.
CPC .... *H04L 63/1425* (2013.01); *G06F 16/24578* (2019.01); *G06F 16/285* (2019.01);
(Continued)

(58) Field of Classification Search
CPC .............. H04L 63/1425; H04L 63/0227; H04L 63/1408; G06F 16/24578; G06F 16/285;
(Continued)

(56) References Cited

U.S. PATENT DOCUMENTS 7,133,846 B1 *  11/2006  Ginter .................... G06F 21/00
                                                            705/54
7,610,267 B2 *  10/2009  Kulkarni ............... G06F 16/951
(Continued)

FOREIGN PATENT DOCUMENTS

WO    WO 2017/115272    7/2020

OTHER PUBLICATIONS

Brovinsky et al—U.S. Appl. No. 62/044,560, filed Sep. 2, 2014 (Year: 2014).*

(Continued)

*Primary Examiner* — Jeffrey D. Popham

(57) ABSTRACT

A dark web monitoring, analysis and alert system comprising a data receiving module configured to receive data collected from the dark web and structured; a Structured Data Database (SDD) connected with the data receiving module, the SDD configured to store the structured data; a Text Search and Analytic Engine (TSAE) connected with the SDD, the TSAE configured to enable advanced search and basic analysis in the structured data; a Knowledge Deduction Service (KDS) connected with the TSAE, the KDS configured to deeply analyze the collected data; the deep analysis comprises extracting insights regarding dark web surfers behavioral patterns and interactions; a Structured Knowledge Database (SKD) connected with the KDS, the SKD configured to store the deep analysis results; and an Alert Service connected with the TSAE and the SKD, the Alert Service configured to provide prioritized alerts based on the deep analysis.

16 Claims, 14 Drawing Sheets

(51) Int. Cl.
*G06F 21/00* (2013.01)
*H04W 4/21* (2018.01)
*G06Q 10/06* (2012.01)
*G06F 16/28* (2019.01)
*G06F 16/2457* (2019.01)
*G06F 16/951* (2019.01)

(52) U.S. Cl.
CPC ............ *G06F 16/951* (2019.01); *G06F 21/00* (2013.01); *G06Q 10/063* (2013.01); *G06Q 50/26* (2013.01); *H04L 63/0227* (2013.01); *H04L 63/1408* (2013.01); *H04W 4/21* (2018.02)

(58) Field of Classification Search
CPC ..... G06F 16/951; G06F 21/00; G06Q 10/063; G06Q 50/26; H04W 4/21
See application file for complete search history.

(56) References Cited

U.S. PATENT DOCUMENTS

| | | | | |
|---|---|---|---|---|
| 7,974,849 B1* | 7/2011 | Begole | ................... | G06Q 10/10 705/1.1 |
| 8,099,408 B2* | 1/2012 | Zhang | ................... | G06F 16/951 707/709 |
| 8,166,013 B2* | 4/2012 | Bandaru | ............ | G06Q 10/0631 707/705 |
| 8,230,062 B2* | 7/2012 | Newton | ............. | G06Q 30/0201 709/224 |
| 8,375,024 B2* | 2/2013 | Goeldi | ................... | G06Q 10/00 707/709 |
| 8,429,011 B2* | 4/2013 | Newton | ............. | G06Q 30/0224 705/14.4 |
| 8,489,643 B1* | 7/2013 | Rubanovich | ......... | G06F 16/957 707/794 |
| 8,515,893 B2* | 8/2013 | Wilson | ................... | G06N 3/02 706/46 |
| 8,535,162 B2* | 9/2013 | Newman | ................. | H04W 4/21 463/42 |
| 8,538,949 B2* | 9/2013 | Liu | ....................... | G06F 3/0482 707/709 |
| 8,745,742 B1* | 6/2014 | Satish | ....................... | G06F 7/00 726/24 |
| 8,832,052 B2* | 9/2014 | Eisen | ................... | G06F 16/951 707/705 |
| 8,832,832 B1* | 9/2014 | Visbal | ................ | H04L 63/1441 726/22 |
| 8,849,567 B2* | 9/2014 | Gupta | ..................... | G06F 16/29 701/450 |
| 8,924,388 B2* | 12/2014 | Elliot | ..................... | G06F 16/211 707/737 |
| 8,949,270 B2* | 2/2015 | Newton | ................. | G06Q 30/02 707/774 |
| 9,009,088 B2* | 4/2015 | Wilson | ................... | G06N 3/063 706/15 |
| 9,122,710 B1* | 9/2015 | Jeffery | ............... | G06Q 30/0201 |
| 9,129,219 B1* | 9/2015 | Robertson | ............... | G06N 5/048 |
| 9,245,252 B2* | 1/2016 | Newton | ................... | G06Q 10/10 |
| 9,317,873 B2* | 4/2016 | Agrawal | ................... | H04L 67/02 |
| 9,319,381 B1* | 4/2016 | Jones | ................... | H04L 63/0227 |
| 9,348,920 B1* | 5/2016 | Kesin | ................... | G06F 16/367 |
| 9,392,008 B1* | 7/2016 | Michel | ............... | H04L 63/1416 |
| 9,483,546 B2* | 11/2016 | Erenrich | ............ | G06F 16/2462 |
| 9,485,265 B1* | 11/2016 | Saperstein | ........ | G06F 16/24575 |
| 9,514,414 B1* | 12/2016 | Rosswog | ................ | G06F 16/93 |
| 9,639,580 B1* | 5/2017 | Xing | ....................... | G06F 16/29 |
| 9,705,901 B2* | 7/2017 | Thapliya | ............... | H04L 63/1416 |
| 9,727,560 B2* | 8/2017 | Chakerian | ................ | G06F 16/84 |
| 9,727,622 B2* | 8/2017 | Kara | ................... | G06Q 10/0639 |
| 9,875,293 B2* | 1/2018 | Chakerian | ............... | G06F 16/287 |
| 9,886,467 B2* | 2/2018 | Kara | ................... | G06F 16/2291 |
| 9,972,015 B2* | 5/2018 | Moore | ................... | G06Q 30/016 |
| 9,973,550 B2* | 5/2018 | Haskins | ................... | G06F 16/245 |
| 10,050,986 B2* | 8/2018 | Nelms | ................... | H04L 63/1425 |
| 10,066,948 B2* | 9/2018 | Setlur | ..................... | G01C 21/34 |
| 10,078,696 B1* | 9/2018 | Sadler | ................... | G06F 16/9535 |
| 10,114,884 B1* | 10/2018 | Valensi | ............... | G06F 16/9024 |
| 10,135,863 B2* | 11/2018 | Dennison | ............ | G06F 16/9535 |
| 10,180,977 B2* | 1/2019 | Fisher | ................... | G06F 16/2322 |
| 10,198,515 B1* | 2/2019 | White | ............... | G06Q 10/06398 |
| 10,218,717 B1* | 2/2019 | Amidon | ............... | H04L 63/1416 |
| 10,218,733 B1* | 2/2019 | Amidon | ............... | H04L 63/1425 |
| 10,223,453 B2* | 3/2019 | Levy | ..................... | G06F 16/951 |
| 10,237,287 B1* | 3/2019 | Amidon | ............... | H04L 63/1433 |
| 10,311,085 B2* | 6/2019 | Rezaei | ............... | G06Q 30/0256 |
| 10,356,032 B2* | 7/2019 | White | ................... | G06Q 10/107 |
| 10,445,377 B2* | 10/2019 | Berk | ........................ | G06F 16/22 |
| 10,454,793 B2* | 10/2019 | Deen | ..................... | H04L 43/04 |
| 10,467,677 B2* | 11/2019 | Wilson | ................... | G06N 3/02 |
| 10,484,407 B2* | 11/2019 | Spiro | ................ | G06F 16/24578 |
| 10,489,377 B2* | 11/2019 | Abraham | ................ | H04L 67/02 |
| 10,528,816 B2* | 1/2020 | Desai | ................... | G06F 16/951 |
| 10,542,031 B2* | 1/2020 | Petry | ........................ | G06F 21/53 |
| 10,545,996 B2* | 1/2020 | Grochocki, Jr. | .. | G06F 16/24573 |
| 2002/0038240 A1* | 3/2002 | Kondo | ................... | G06Q 30/02 705/14.51 |
| 2002/0052928 A1* | 5/2002 | Stern | ................... | G06F 16/9535 709/218 |
| 2002/0091942 A1* | 7/2002 | Cooper | ................ | H04L 41/22 726/1 |
| 2003/0125887 A1* | 7/2003 | Ogawa | ..................... | G01D 1/14 702/66 |
| 2006/0173987 A1* | 8/2006 | Friesen | ................... | H04L 67/16 709/223 |
| 2006/0277175 A1* | 12/2006 | Jiang | ................... | G06F 16/951 |
| 2006/0294074 A1* | 12/2006 | Chang | ................... | G06F 16/951 |
| 2007/0192863 A1* | 8/2007 | Kapoor | ................... | H04L 67/10 726/23 |
| 2008/0027769 A1* | 1/2008 | Eder | ................ | G06Q 10/06375 705/7.28 |
| 2008/0086459 A1* | 4/2008 | Ryan | ..................... | G06F 16/951 |
| 2008/0097958 A1* | 4/2008 | Ntoulas | ................. | G06F 16/951 |
| 2008/0229415 A1* | 9/2008 | Kapoor | ................... | H04L 63/14 726/22 |
| 2008/0262990 A1* | 10/2008 | Kapoor | ............... | H04L 63/1408 706/20 |
| 2008/0262991 A1* | 10/2008 | Kapoor | ................... | H04L 63/14 706/20 |
| 2008/0263025 A1* | 10/2008 | Koran | ..................... | G06Q 30/02 |
| 2008/0281794 A1* | 11/2008 | Mathur | ................ | G06Q 10/10 |
| 2008/0282338 A1* | 11/2008 | Beer | ................... | H04L 63/1441 726/12 |
| 2009/0200461 A1 | 8/2009 | Raj et al. | | |
| 2009/0204610 A1* | 8/2009 | Hellstrom | ............... | G06F 16/00 |
| 2009/0210406 A1* | 8/2009 | Freire | ..................... | G06F 16/35 |
| 2009/0210407 A1* | 8/2009 | Freire | ..................... | G06F 16/951 |
| 2009/0319518 A1* | 12/2009 | Koudas | ................... | G06F 16/338 |
| 2010/0169301 A1* | 7/2010 | Rubanovich | .......... | G06F 16/951 707/709 |
| 2011/0119100 A1* | 5/2011 | Ruhl | ..................... | G06Q 10/06 705/7.11 |
| 2011/0119226 A1* | 5/2011 | Ruhl | ..................... | G06F 16/958 706/52 |
| 2011/0131652 A1* | 6/2011 | Robinson | ............ | H04L 63/1408 726/22 |
| 2011/0213869 A1* | 9/2011 | Korsunsky | .......... | H04L 63/1483 709/223 |
| 2011/0214157 A1* | 9/2011 | Korsunsky | .......... | H04L 63/1441 726/1 |
| 2011/0219035 A1* | 9/2011 | Korsunsky | ............. | G06F 21/00 707/784 |
| 2011/0231383 A1* | 9/2011 | Smyth | ................... | G06F 16/9535 707/707 |
| 2011/0231510 A1* | 9/2011 | Korsunsky | ............. | G06F 21/55 709/213 |
| 2011/0231564 A1* | 9/2011 | Korsunsky | .......... | H04L 63/1483 709/231 |
| 2011/0238855 A1* | 9/2011 | Korsunsky | ............. | G06F 21/56 709/231 |

(56) References Cited

U.S. PATENT DOCUMENTS

| | | | |
|---|---|---|---|
| 2011/0270820 A1* | 11/2011 | Agarwal | G06F 40/253 707/709 |
| 2012/0240185 A1* | 9/2012 | Kapoor | H04L 41/0866 726/1 |
| 2013/0018912 A1* | 1/2013 | Bao | G06F 16/951 707/769 |
| 2013/0151616 A1* | 6/2013 | Amsterdamski | H04L 67/22 709/204 |
| 2013/0173638 A1* | 7/2013 | Ben-Reuven | G06F 16/24578 707/749 |
| 2013/0238600 A1* | 9/2013 | Kindler | G06F 21/552 707/722 |
| 2013/0332109 A1* | 12/2013 | Luiset | H04L 63/1441 702/179 |
| 2013/0332460 A1* | 12/2013 | Pappas | G06F 16/35 707/740 |
| 2014/0007238 A1* | 1/2014 | Magee | H04L 63/1408 726/24 |
| 2014/0040387 A1* | 2/2014 | Spivack | H04L 51/32 709/206 |
| 2014/0195449 A1* | 7/2014 | Komissarchik | G06F 16/345 705/319 |
| 2015/0040217 A1* | 2/2015 | Abuelsaad | H04L 63/1408 726/22 |
| 2015/0066895 A1* | 3/2015 | Komissarchik | G06F 16/345 707/709 |
| 2015/0088664 A1* | 3/2015 | Sano | G06F 16/50 705/14.69 |
| 2015/0120804 A1* | 4/2015 | Eschbach | H04L 67/2842 709/203 |
| 2015/0264078 A1* | 9/2015 | Beauchesne | H04L 63/1408 726/23 |
| 2016/0036838 A1* | 2/2016 | Jain | H04L 63/1416 726/23 |
| 2016/0119365 A1* | 4/2016 | Barel | G06F 16/84 726/12 |
| 2016/0294854 A1* | 10/2016 | Parthasarathi | H04L 63/20 |
| 2016/0342910 A1* | 11/2016 | Chu | G06T 11/206 |
| 2016/0381054 A1* | 12/2016 | Againan | H04L 63/1408 726/23 |
| 2017/0085537 A1* | 3/2017 | Benedek | H04L 63/062 |
| 2017/0109837 A1* | 4/2017 | Loganathan | G06Q 40/128 |
| 2017/0161520 A1* | 6/2017 | Lockhart, III | G06F 21/6263 |
| 2017/0228797 A1* | 8/2017 | Nath | G06Q 30/0277 |
| 2017/0249389 A1* | 8/2017 | Brovinsky | G06F 16/9535 |
| 2018/0025433 A1* | 1/2018 | Crabtree | G06Q 40/08 705/4 |
| 2018/0121539 A1* | 5/2018 | Ciulla | G06F 16/3344 |
| 2018/0167412 A1* | 6/2018 | Barrett | H04L 67/2814 |
| 2018/0276508 A1* | 9/2018 | Crabtree | G06Q 10/063112 |
| 2018/0288027 A1* | 10/2018 | Gulbrandsen | G06F 21/10 |
| 2018/0288073 A1* | 10/2018 | Hopper | G06Q 20/401 |
| 2018/0322584 A1* | 11/2018 | Crabtree | G06N 20/00 |
| 2019/0222602 A1* | 7/2019 | Linder | G06F 16/9535 |
| 2019/0317968 A1* | 10/2019 | De Los Santos Vilchez | H04L 63/14 |
| 2019/0349351 A1* | 11/2019 | Verma | G06F 21/31 |
| 2019/0349393 A1* | 11/2019 | Nunes | H04L 51/046 |
| 2020/0296137 A1* | 9/2020 | Crabtree | G06F 16/2477 |
| 2020/0296138 A1* | 9/2020 | Crabtree | G06F 16/951 |

OTHER PUBLICATIONS

Dang Yan et al: "An integrated framework for analyzing multilingual content in Web 2.0 social media", Decision Support Systems, Elsevier Science Publishers, Amsterdam, NL, vol. 61, Feb. 26, 2014 (Feb. 26, 2014), pp. 126-135, XP028604740, ISSN: 0167-9236, DOI:10.1016/J.DSS.2014.02.004*abstract * *paragraph [0001] * *paragraphs [02.2]-[2.2.2.4]*.

European Search Report in EP 16881370 dated Jul. 18, 2019.

International Search Report in PCT/IB2016/058016 dated Apr. 6, 2017.

Chen, Hsinchun et al., "Uncovering the Dark Web: A case study of Jihad on the Web", Journal of the American Society for Information Science and Technology, 2008, 59.8; 1347-1359, Jun. 30, 2008.

Fu, Tianjun, Abbasi, Ahmed, Chen, Hsinchun, "A focused crawler for Dark Web forums", Journal of the American Society for Information Science and Technology, 2010, 61.6, 1213-1231, Jun. 30, 2010.

Biryukov, Alex, Pustogarov, Ivan, Weinmann, Ralf-Philipp, "Trawling For tor hidden services: Detection, measurement, deanonymization", In; Security and Privacy (SP), 2013 IEEE Symposium on. IEEE, 2013. p. 80-94, Dec. 31, 2013.

Communication Pursuant to Article 94(3) EPC dated Aug. 26, 2020 From the European Patent Office Re. Application No. 16881370.7. (5 Pages).

International Preliminary Report on Patentability dated Jul. 3, 2018 From the International Bureau of WIPO Re. Application No. PCT/IB2016/058016. (7 Pages).

* cited by examiner

1300

DARK WEB MONITORING, ANALYSIS AND ALERT SYSTEM AND METHOD

CROSS-REFERENCE TO RELATED PATENT APPLICATIONS

This patent application claims priority from and is related to U.S. Provisional Patent Application Ser. No. 62/271,344, filed 28 Dec. 2015, this U.S. Provisional Patent Application incorporated by reference in its entirety herein.

FIELD OF THE INVENTION

The present invention generally relates to web activities analysis and specifically to a Dark Web monitoring, analysis and alert system and method.

BACKGROUND

The Dark Web is a term that refers specifically to a collection of websites that are publicly visible, but hide the IP addresses of the servers that run them. The dark web forms a small part of the Deep Web, the part of the Web not indexed by search engines. Thus they can be visited easily by any web user, but it is very difficult to work out who is behind the sites and search engines cannot find them.

The dark nets which constitute the dark web include small, friend-to-friend peer-to-peer networks, as well as large, popular networks like Freenet, I2P, and Tor, operated by public organizations and individuals. Users of the dark web refer to the regular web as the Clear net due to its unencrypted nature. The Tor dark web may be referred to as Onion land, a reference to the network's name as "the onion router."

Almost all sites on the so-called Dark Web hide their identity using, for example, the Tor encryption tool. Tor can be used to hide your identity, and spoof your location.

To visit a site on the Dark Web that is using Tor encryption, the web user needs to be using Tor. Just as the end user's IP is bounced through several layers of encryption to appear to be at another IP address on the Tor network, so is that of the website.

Because of the nature of the Dark Web and the illegal activities it enables, there is a long felt need for a system that monitors the Dark Web, analyses harvested data and provides alerts according to defined parameters.

SUMMARY

According to an aspect of the present invention, there is provided a dark web monitoring, analysis and alert system comprising at least one Crawler connected with the dark web, the at least one Crawler configured to scan and collect data from the dark web; a Structured Data Extractor (SDE) connected with the at least one Crawler, the SDE configured to analyze the collected data provided by the at least one Crawler and to extract structural parameters; a Structured Data Database (SDD) connected with the SDE, The SDD configured to store the structural parameters extracted by the SDE; a Text Search and Analytic Engine (TSAE) connected with the SDD, the TSAE configured to enable advanced search and basic analysis in the collected data; a Knowledge Deduction Service (KDS) connected with the TSAE, the KDS configured to deeply analyze the collected data; a Structured Knowledge Database (SKD) connected with the KDS, the SKD configured to store the deep analysis results; and an Alert Service connected with the TSAE and the SKD, the Alert Service configured to provide alerts based on the deep analysis.

The basic analysis may comprise at least one of date in which most of comments were written, number of posts a surfer wrote for a specific search query, distribution of categories in a site, time line trending for a specific search query and top sites for a specific query.

The deep analysis may comprise at least one of finding surfers who have the highest reputation and monitoring their activities, and monitoring surfers' activity hours, social connections and group dynamics.

The search results may be prioritized according to at least one of: source scoring; recency; user reputation; record type scoring; search result relevance scoring; and content analysis scoring.

The system may further comprise a Hidden Service Locator (HSL) connected with the dark web and the at least one Crawler, the HSL may be configured to find hidden Uniform Resource Locators (URLs) in the dark web; the at least one Crawler may further be configured to scan and collect data from the dark web using the URLs.

The HSL may comprise a Tor Relay (TR) configured to blend among relays of The Onion Router (TOR) network, the TR may be configured to keep a record of URLs routed therethrough.

The at least one Crawler may comprises an IP Changer Proxy (IPCP) connected with the dark web, the IPCP configured to manage the Internet Protocol (IP) address of the at least one Crawler; a Spider connected with the IPCP, the Spider configured to progress from one web page to another; the Spider comprises a Link Extractor configured to extract URLs it finds in each web page; a Page Classifier and URL Filtering Module (PCUFM) connected with the Spider and the HSL, the PCUFM configured to classify the web pages extracted by the Spider; and a Crawler Control Center (CCC) connected with the Spider, the CCC configured to control the operation timing and the pace of data collection of the at least one Crawler.

The IP address managing may comprise at least one of: hide the at least one Crawler's real IP address and change the at least one Crawler's IP address.

The progress may be performed by extracting URLs the Link Extractor finds in each web page.

The extracted URLs may be saved in a URL Repository.

The PCUFM may further be configured to filter unwanted or unnecessary URLs and save the remaining URLs in a URL Repository.

The system may further comprise a Configuration Database configured to store Crawler's configuration.

The Crawler's configuration may comprise at least one of initial URLs for the at least one Crawler to start from, username(s) and password(s) of the at least one Crawler and the at least one Crawler's timing setting.

The system may further comprise a Web Content Cache configured to store web pages extracted by the Spider.

The at least one Crawler may further be configured to optimize its scanning pace versus its secrecy.

The optimizing may comprise decreasing the scanning pace and changing the at least one Crawler's IP address.

The optimizing may comprises changing the at least one Crawler's username.

The Structured Data Extractor may comprises a Wrapper Generator; a Wrapper Database; and an Extractor; the Wrapper Generator may be configured to analyze a web page, find patterns, create a wrapper and save the wrapper in the Wrapper Database; the Extractor may be configured to receive a web page and a suitable wrapper from the Wrapper Database and to extract relevant data from the page according the wrapper.

The wrapper may comprises labels.

The Knowledge Deduction Service may further be configured to classify posts into categories and to analyze the sentiment of comments.

The sentiments may comprise negative, positive and neutral sentiments.

The Text Search and Analytic Engine may further be configured to determine a surfer's fields of interest by summing the surfer's posts in each category.

The Knowledge Deduction Service may further be configured to identify groups by monitoring the number of interactions between surfers.

The Knowledge Deduction Service may further be configured to perform an activity times analysis.

The activity times analysis may comprises calculating a temporal data distribution within a time frame; saving the time frame which includes most of the data; and saving the average and the standard deviation of the temporal data distribution.

The Knowledge Deduction Service may further be configured to find surfers who use different aliases.

The finding may comprises at least one of locating communication information used by more than one surfer; looking for similar aliases excluding common names; locating surfers with similar activity pattern using the activity times analysis; locating surfers with similar fields of interest; locating surfers who are active for a certain period and then continue the activity in other places/other aliases; locating surfers who post the same content at the same time in two different locations; counting the most frequent words used by a surfer; and analyzing surfers' text.

The analyzing surfers' text may comprise at least one of the use of punctuation marks, upper/lower case and common misspelling.

The Alert Service may comprise a Scheduler configured to schedule the monitoring related to each alert; an Alert Engine configured to send alerts; and an Alert Rule module.

The alerts may be sent via at least one of e-mail and Short Message Service (SMS).

The alerts may be sent according to rules written in an Alert Rules Database and prioritized according to processed data stored in the Structured Knowledge Database.

The prioritization may comprises at least one of: source scoring; recency; user reputation; record type scoring; search result relevance scoring; and content analysis scoring.

The Alert Service may comprise: a Scheduler configured to schedule the monitoring related to each alert; an Alert Engine configured to send alerts; and an Alert Rule.

The alerts may be sent according to rules written in an Alert Rules Database and prioritized according to the prioritized search results.

The Alert Rule module may be configured to at least one of: define wake up intervals, enable search by a key word, enable search by an activity related to a certain surfer, enable search by an activity of a certain group, enable search by a change in trend of a certain key word and enable search by a new phrase or a word that appears more than a predetermined number of times.

The system may further comprise a case management module configured to enable a client of the system to create a case file in order to manage a research or an investigation.

The system may further comprise a recommendation engine configured to recommend adding relevant surfers and/or posts to the case file.

The recommendation may be performed according to at least one of: building a connection map of existing surfers in the case file, analyzing the connections and recommending adding surfers that have a strong connection with the existing surfers in the case file; "similar" surfers; surfers that published posts collected in the case file; surfers that are mentioned in existing posts' content; surfers having similar fields of interest; and posts that have a strong contextual matching.

The contextual matching may comprise at least one of: same classification, same time in the time range of posts in the case file and posts having a words-matching up to a certain threshold.

According to another aspect of the present invention, there is provided a method of dark web monitoring, analyzing and providing alerts, comprising: receiving client's preferences for defining at least one alert; providing data collected from the dark web and structured; performing an advanced search and basic analysis in the structured data based on the client's preferences; performing deep analysis of the structured data based on the client's preferences; and providing the at least one alert based on the deep analysis.

Providing the data may comprise scanning and collecting data from the dark web by at least one Crawler, analyzing the collected data provided by the at least one Crawler and extracting structural parameters.

The method may further comprise storing the structural parameters.

The basic analysis may comprise the date in which most of comments were written, how many posts a surfer wrote for a specific search query, distribution of categories in a site, time line trending for a specific search query and top sites for a specific query.

The search results may be prioritized according to at least one of: source scoring; recency; user reputation; record type scoring; search result relevance scoring; and content analysis scoring.

The deep analysis may comprise at least one of finding surfers who have the highest reputation and monitoring their activities, and monitoring surfers' activity hours, social connections and group dynamics.

The method may further comprise storing the deep analysis results.

The method may further comprise finding hidden Uniform Resource Locators (URLs) in the dark web and scanning and collecting data from the dark web using the hidden URLs.

The method may further comprise blending by a Tor Relay (TR) among relays of The Onion Router (TOR) network and keeping a record of URLs routed through the TOR.

The at least one Crawler may comprise: managing Internet Protocol (IP) address of the at least one Crawler; progressing from one web page to another and extracting URLs found in each web page; classifying the extracted web pages; and controlling operation timing and pace of data collection.

The IP address managing may comprise at least one of: hiding the at least one Crawler's real IP address and changing the at least one Crawler's IP address.

The progressing may comprise extracting URLs found in each web page.

The method may further comprise saving the extracted URLs.

The method may further comprise filtering unwanted or unnecessary URLs and saving the remaining URLs.

The method may further comprise storing the at least one Crawler's configuration.

The at least one Crawler's configuration may comprise at least one of initial URLs for the at least one Crawler to start from, username(s) and password(s) of the at least one Crawler and the at least one Crawler's timing setting.

The method may further comprise storing extracted web pages.

The at least one Crawler may further comprise optimizing its scanning pace versus its secrecy.

The optimizing may comprise decreasing the scanning pace and changing the at least one Crawler's IP address.

The optimizing may comprise changing the at least one Crawler's username.

The method may further comprise: analyzing a web page, finding patterns, creating a wrapper and saving the wrapper; and receiving a web page and a suitable wrapper and extracting relevant data from the page according to the wrapper.

The wrapper may comprise labels.

The method may further comprise classifying posts into categories and analyzing the sentiment of comments.

The sentiments may comprise negative, positive and neutral sentiments.

The method may further comprise determining a surfer's fields of interest by summing the number of the surfer's posts in each category.

The method may further comprise identifying groups by monitoring the number of interactions between surfers.

The method may further comprise performing an activity times analysis.

The activity times analysis may comprise: calculating a temporal data distribution within a time frame; saving the time frame which includes most of the data; and saving the average and the standard deviation of the temporal data distribution.

The method may further comprise finding surfers who use different aliases.

Finding surfers may comprise at least one of: locating communication information used by more than one surfer; looking for similar aliases excluding common names; locating surfers with similar activity pattern using the activity times analysis; locating surfers with similar fields of interest; locating surfers who are active for a certain period and then continue the activity in other places/other aliases; locating surfers who post the same content at the same time in two different locations; counting the most frequent words used by a surfer; and analyzing surfers' text.

Analyzing surfers' text may comprise at least one of the use of punctuation marks, upper/lower case and common misspelling.

The providing the at least one alert may comprise: scheduling the monitoring related to each alert; and sending alerts.

The method may further comprise sending the alerts via at least one of e-mail and Short Message Service (SMS).

The method may further comprise sending the alerts according to rules and prioritized according to processed data.

The prioritization may comprise at least one of: source scoring; recency; user reputation; record type scoring; search result relevance scoring; and content analysis scoring.

The providing the at least one alert may comprise: scheduling the monitoring related to each alert; and sending alerts.

The method may further comprise sending the alerts according to rules written in an Alert Rules Database and prioritized according to the prioritized search.

The method may further comprise at least one of: defining wake up intervals, enabling search by a key word, enabling search by an activity related to a certain surfer, enabling search by an activity of a certain group, enabling search by a change in trend of a certain key word and enabling search by a new phrase or a word that appears more than a predetermined number of times.

The method may further comprise creating a case file in order to manage a research or an investigation.

The method may further comprise providing recommendations for adding relevant surfers and/or posts to the case file.

The recommendation may be performed according to at least one of: building a connection map of existing surfers in the case file, analyzing the connections and recommending adding surfers that have a strong connection with the existing surfers in the case file; "similar" surfers; surfers that published posts collected in the case file; surfers that are mentioned in existing posts' content; surfers having similar fields of interest; and posts that have a strong contextual matching.

The contextual matching may comprise at least one of: same classification, same time in the range of posts in the case file and posts having a words-matching up to a certain threshold.

According to another aspect of the present invention, there is provided a dark web monitoring, analysis and alert system comprising: a data receiving module configured to receive data collected from the dark web and structured; a Structured Data Database (SDD) connected with the data receiving module, the SDD configured to store the structured data; a Text Search and Analytic Engine (TSAE) connected with the SDD, the TSAE configured to enable advanced search and basic analysis in the structured data; a Knowledge Deduction Service (KDS) connected with the TSAE, the KDS configured to deeply analyze the collected data; the deep analysis comprises extracting insights regarding dark web surfers behavioral patterns and interactions; a Structured Knowledge Database (SKD) connected with the KDS, the SKD configured to store the deep analysis results; and an Alert Service connected with the TSAE and the SKD, the Alert Service configured to provide prioritized alerts based on the deep analysis.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the accompanying drawings:

FIG. 1 is a schematic view of the system according to embodiments of the present invention;

FIG. 2 is a schematic view of the Crawler of FIG. 1 according to embodiments of the present invention;

FIG. 3 is a flowchart showing the process performed by the Crawler according to embodiments of the present invention;

FIG. 4 is a schematic view of the Structured Data Extractor of FIG. 1 according to embodiments of the present invention;

FIG. 5 is a schematic view of the data sources connected with the Knowledge Deduction Service of FIG. 1;

FIG. 6 represents a graph of two forums connected via a "Referring" from one forum to the other;

FIG. 7 shows an exemplary surfer and his posts and comments;

FIG. 8 shows an exemplary representation of the fields of interest of an exemplary surfer;

FIG. 9A shows an exemplary graph representing the interactions between two surfers;

FIG. 9B shows an exemplary graph representing the total number of interactions between the two surfers of FIG. 9A;

FIG. 10 shows an exemplary interactions graph, where the groups that have at least four interactions are highlighted;

Figure 11:
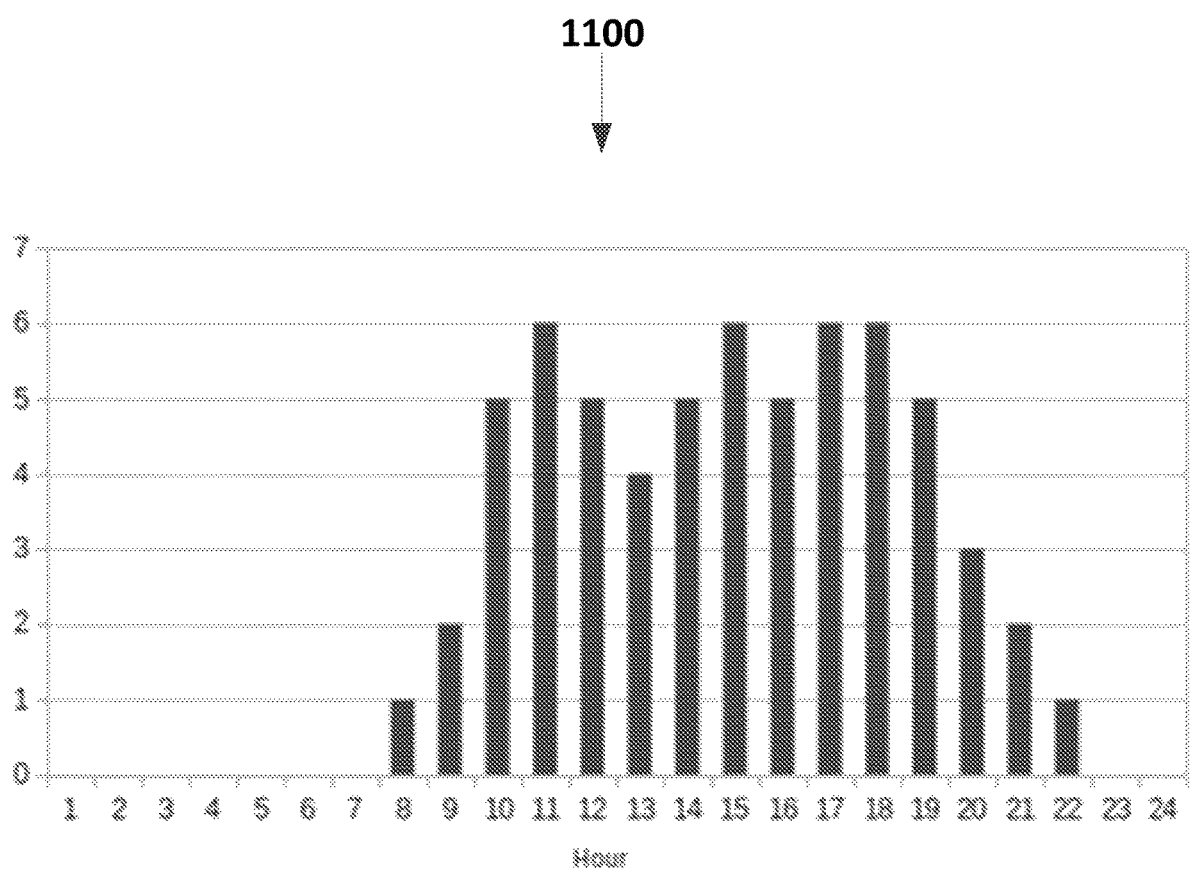

FIG. 11 shows an exemplary data distribution graph represented by the number of activities in each hour.

Figure 1:
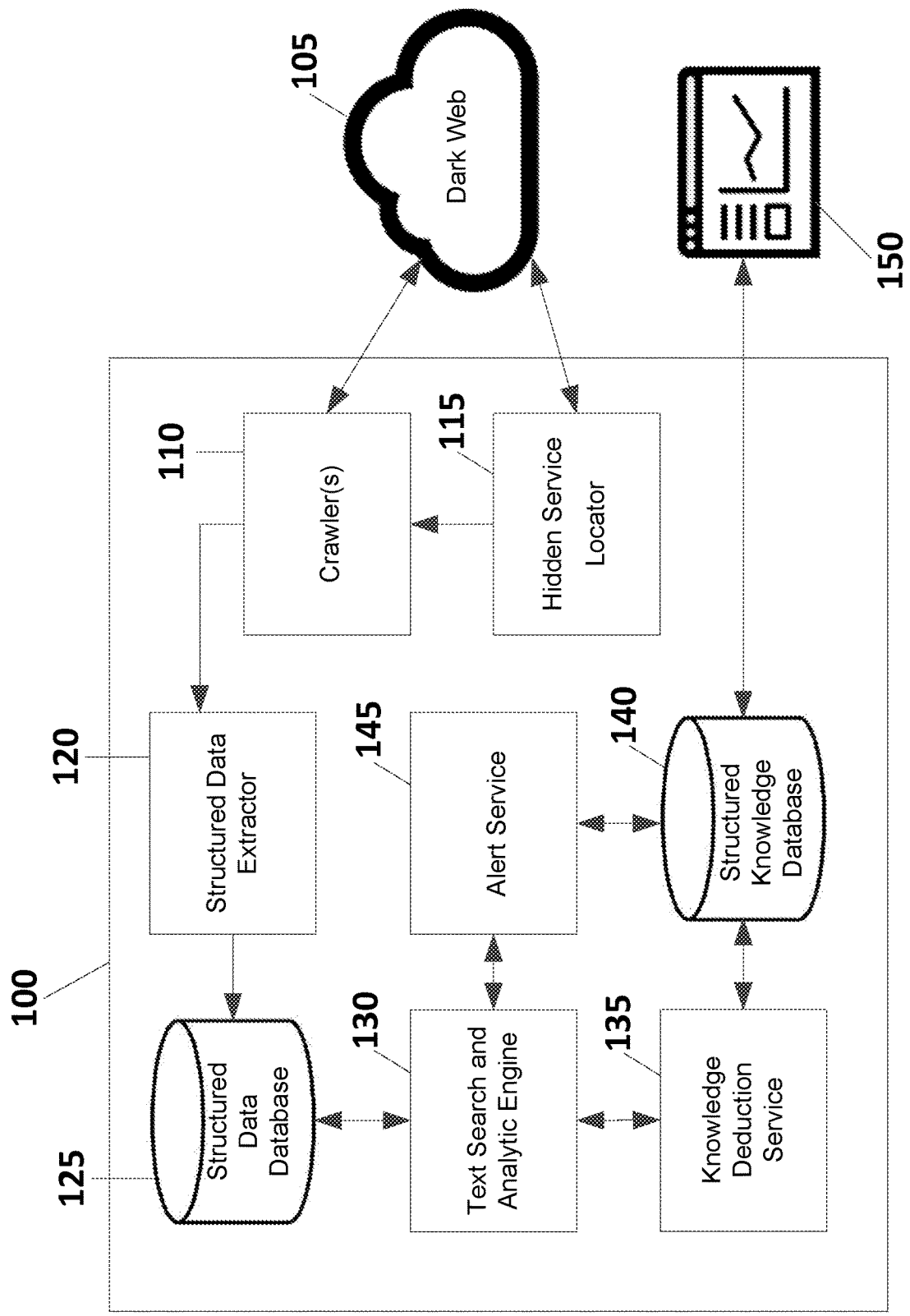
Figure 11A:
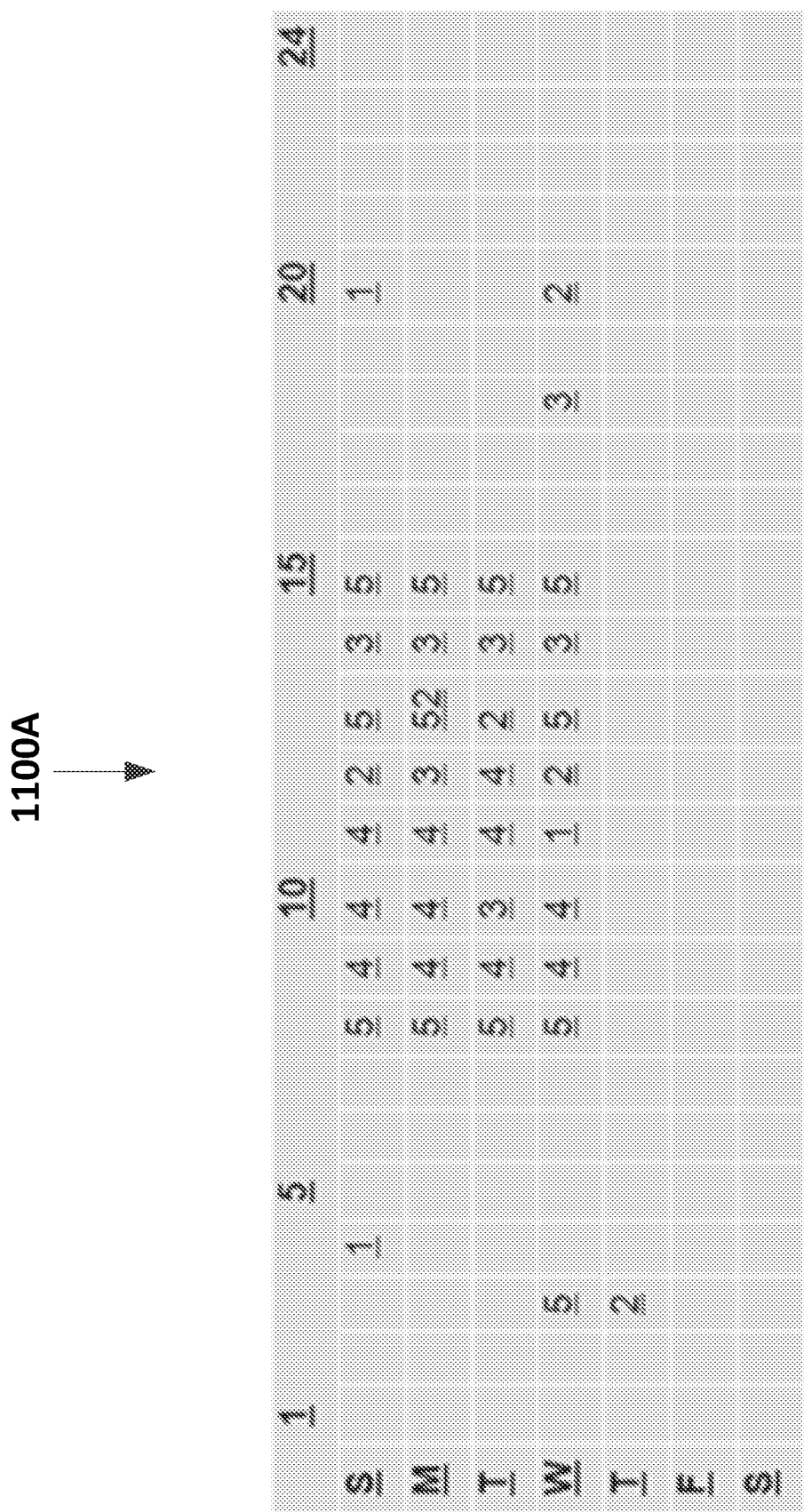
Figure 12:
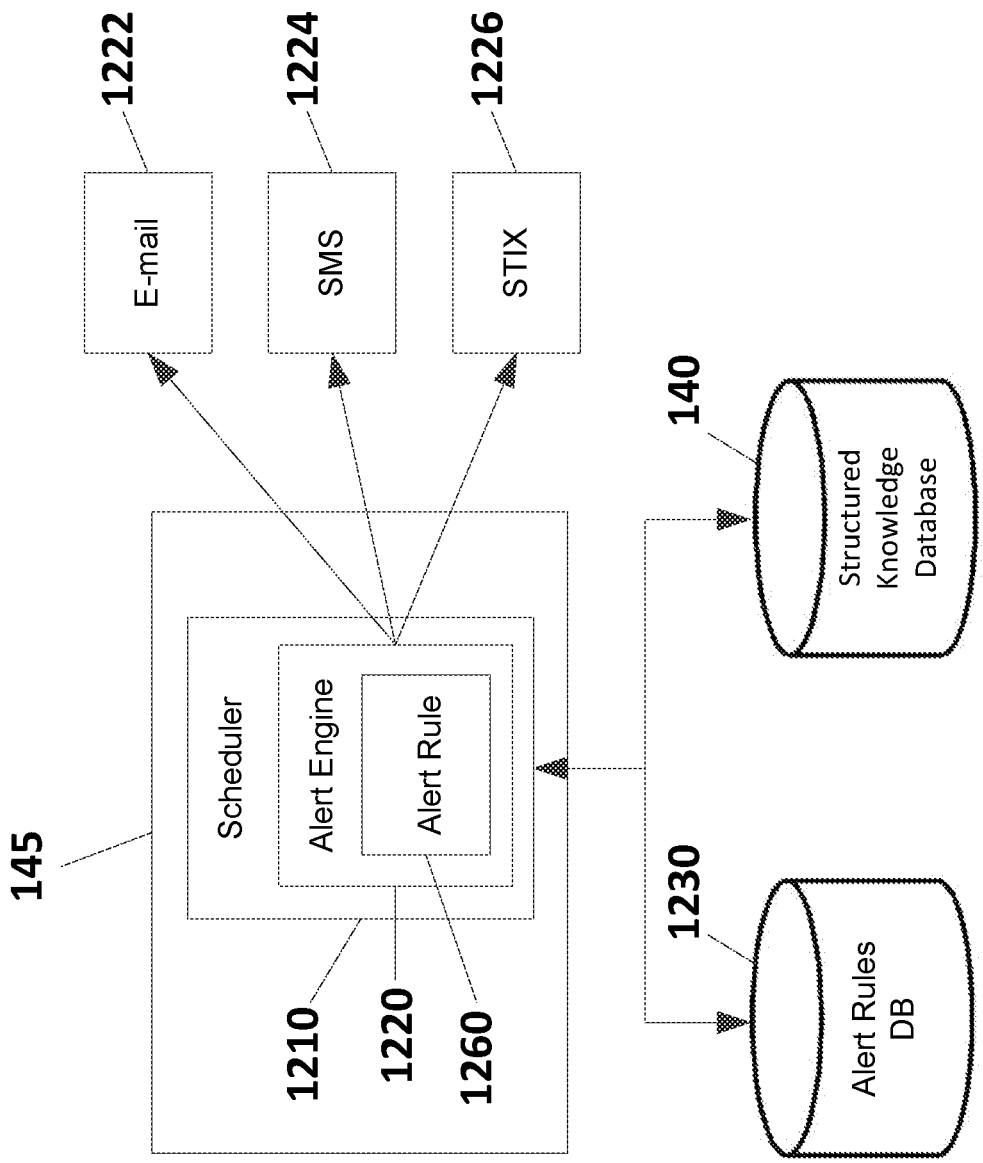
Figure 13:
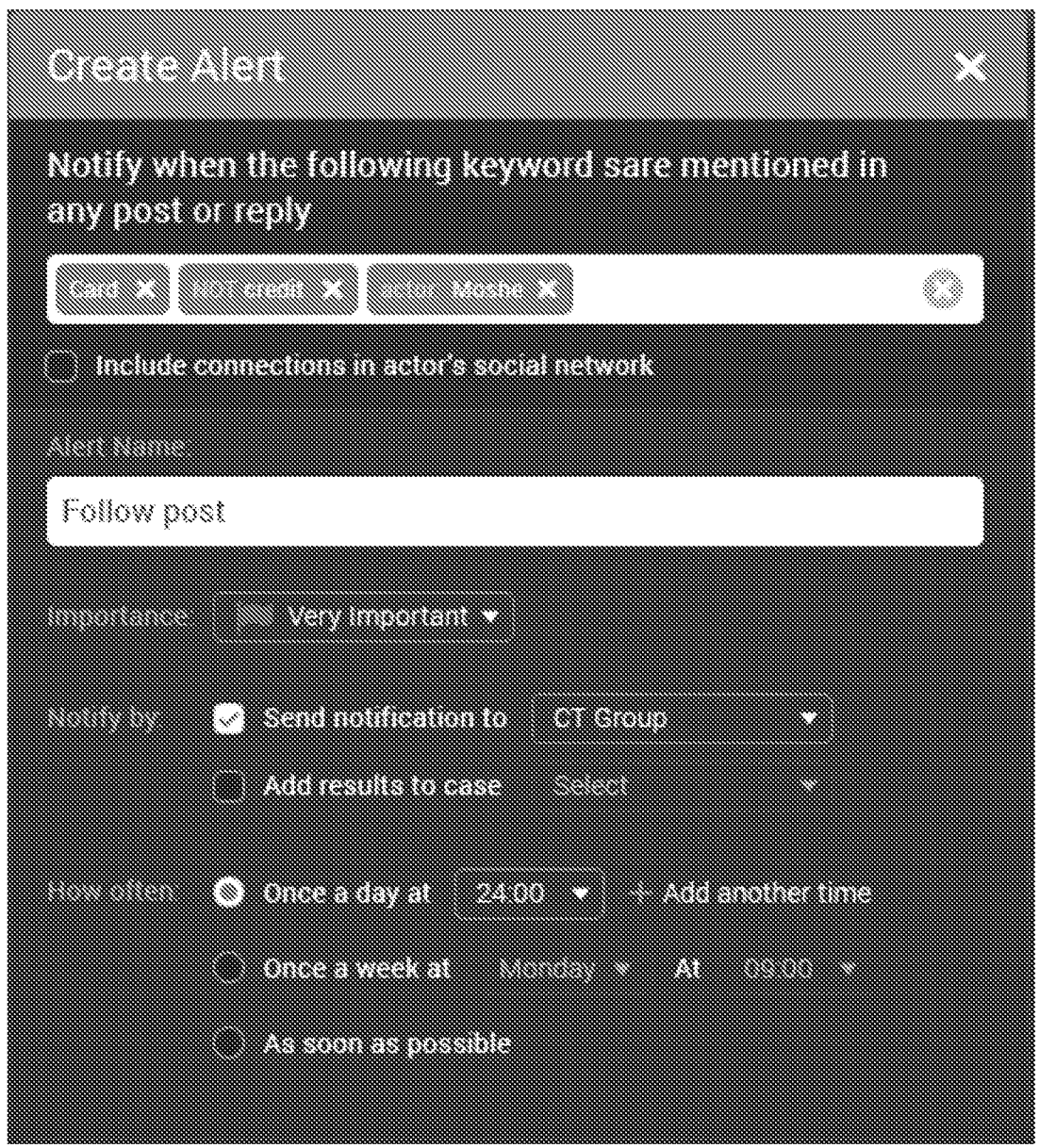

FIG. 11A shows another exemplary data distribution graph using a matrix of 24×7;

FIG. 12 is a schematic view of the Alert Service of FIG. 1 components according to embodiments of the present invention; and FIG. 13 shows an exemplary user interface for creating an alert according to embodiments of the present invention.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention provides a dark web monitoring, analysis and alert system enabling to monitor dark web activities taking place in online stores, forums, etc. and provide information and alerts when suspicious threats are detected.

The Dark Web is a term that refers to a collection of websites that are publicly visible, but hide the IP addresses of the servers that run them. The dark web forms a small part of the Deep Web, the part of the web not indexed by search engines. Thus they can be visited by any web user, but it is very difficult to work out who is behind the sites.

It will be appreciated that the term Dark Web here and below may refer to any part of the web including any part of the Deep Web and preferably the part of the web in which surfers are anonymous.

The system of the present invention tracks and monitors anonymous surfers, analyzes their activities and their social network thus enabling to track surfers even if they change their identity.

FIG. 1 is a schematic view of the system 100 according to embodiments of the present invention, comprising:
- at least one Crawler 110 that scans and collects information from the dark web 105 and other relevant web sites (optional);
- a Hidden Service Locator 115 that finds hidden URLs (optional);
- a Structured Data Extractor 120 that analyses html pages and extracts structural parameters (optional);
- a Structured Data Database 125 that stores the structural parameter extracted by the Structured Data Extractor 120;
- a Text Search and Analytic Engine 130 that enables advanced search in the Structured Data Database 125 and basic analysis;
- a Knowledge Deduction Service 135 that deeply analyses the data;
- a Structured Knowledge Database 140;
- an Alert Service 145 that provides alerts.

According to embodiments of the invention, the system of the present invention may comprise only the Structured Data Database 125, the Text Search and Analytic Engine 130, the Knowledge Deduction Service 135, the Structured Knowledge Database 140 and the Alert Service 145. The URLs, the data and/or the structured data may be provided to the system by a data provider, received via a data receiving module and stored in the Structured Data Database 125.

The uniqueness of the Crawler(s) 110 of the present invention is the ability to:
1. Deal with systems that detect Crawlers, namely, disguise as a "regular" surfer.
2. Control the timing and amount of data collection.
3. Change its own IP addresses.

It will be appreciated that the Crawler 110 is not limited to these exemplary abilities. Alternatively, it may have at least one of these abilities or more than these three described.

Figure 2:
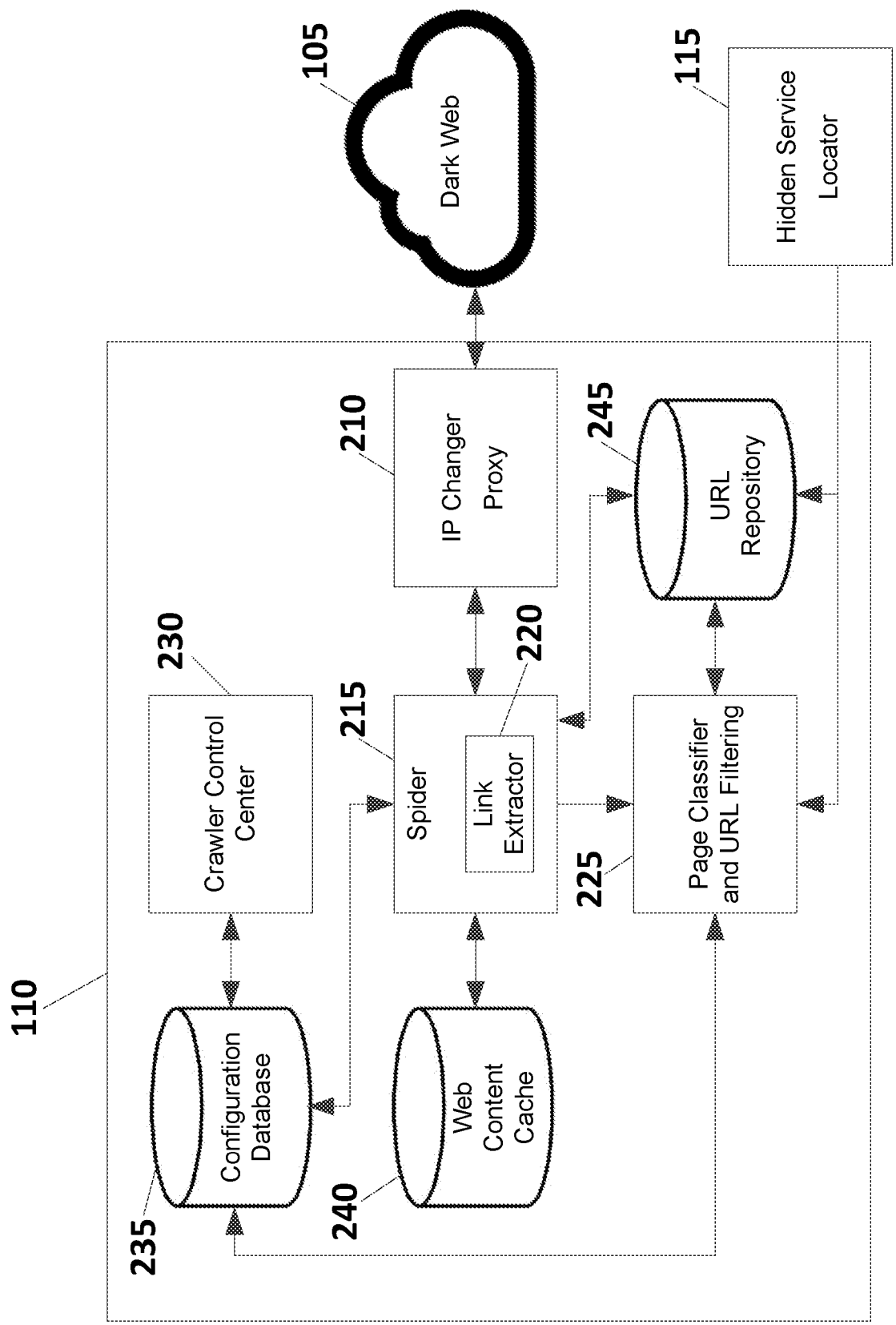

FIG. 2 is a schematic view of the Crawler 110 of FIG. 1 according to embodiments of the present invention, comprising:
- an IP Changer Proxy 210 that manages the IP address of the Crawler 110 in order to hide the Crawler's real address and changes the Crawler's address in cases where the Crawler logs in to a web site with different usernames; the IP Changer Proxy also mediates between the Crawler 110 protocol and internet protocols (e.g. internet relay chat (IRC), Hypertext Transfer Protocol (http), etc.)
- a Spider 215 that progresses from one web page to another by extracting the URLs it finds in each web page. The Spider 215 comprises a Link Extractor 220 that extracts and saves the URLs it finds in each web page in a URL Repository 245;
- a Page Classifier and URL Filtering module 225 that classifies the web pages extracted by the Spider 215, filters the unwanted or unnecessary URLs (e.g. URLs from Google) and saves the remaining URLs in the URL Repository 245;
- a Crawler Control Center 230 that controls the Crawler's operation timing and the pace of data collection;
- a Configuration Database 235 that stores the required Crawler configuration, for example, initial URLs for the Crawler to start from, username(s) and password(s) of the Crawler and the Crawler's timing setting (if changed from default), e.g. the number of requests per day, the number of samples per day, etc. According to embodiments of the invention, the initial URLs may be provided manually by an analyst. Alternatively or additionally, the initial URLs may be extracted from the internet (e.g. from Google).

a Web Content Cache 240 that stores web pages extracted by the Spider 215.

Figure 3:
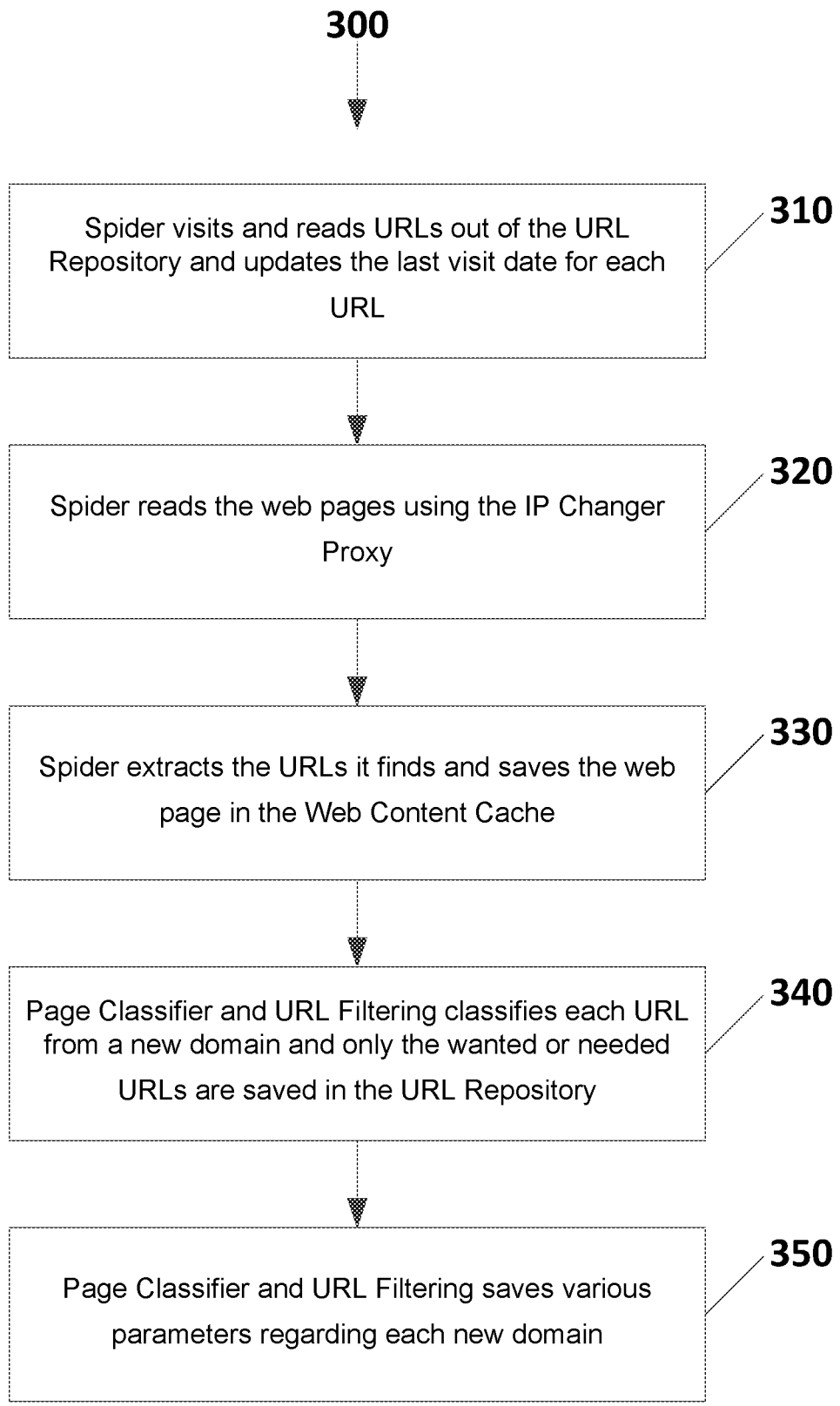

FIG. 3 is a flowchart 300 showing the process performed by the Crawler 110 according to embodiments of the present invention. In step 310, the Spider 210 visits and reads URLs out of the URL Repository 245 and updates the last visit date for each URL. Reading URLs from the same domain is random. The random reading assists in being undetectable. In step 320, the Spider 210 reads the web pages using IP addresses provided by the IP Changer Proxy 210 in order to hide its real IP address. In step 330, for each web page, using the Link Extractor 220, the Spider 210 extracts the URLs it finds and saves the web page in the Web Content Cache 240 in order to enable the system to process or reprocess web pages in a later phase. In step 340, using the Page Classifier and URL Filtering module 225, each URL from a new domain is classified and only the wanted or needed URLs are saved in the URL Repository 245. Wanted or needed URLs are URLs that contain a key word(s) or a topic(s) that the system is currently interested in. In step 350, for each new domain, the Page Classifier and URL Filtering module 225 stores in the Configuration DB 235 various parameters, such as for example the web page's header, in order to be able to locate and scan this domain in the future in case the address will be changed.

Many web sites have Crawler detection mechanisms. In order to avoid being detected by these mechanisms the system of the present invention:
1. Controls the scanning pace—the number of scanned pages per time unit (minute, second).
2. Controls the scanning duration and sequence—for example, scans for 8 hours and rests for 4 hours.
3. Scans randomly—the scanning order of a web page and the extraction of web pages it contains are random.
4. Scans in parallel—a plurality of Crawlers, having a plurality of IP addresses, may scan the same web page simultaneously.

Optimization of Scanning Pace Versus Secrecy

In order to be able to scan web pages which update frequently, the Crawler has to optimize its scanning pace. The Crawler may start the scan with default parameters and optimize the process during the scan. If the web page is updated frequently, faster than the Crawler is able to scan, the Crawler may, for example, increase the scanning pace and/or add another Crawler to scan with it simultaneously. If the Crawler is blocked by blocking its IP address, it may, for example, change its IP address and decrease the scanning pace. If the Crawler is blocked by banning its username (in sites that require user registration), the Crawler may, for example, replace its username, change its IP address and decrease the scanning pace.

In the dark web the URLs are hidden hence the challenge is to find URLs other than the ones existing in blogs, forums, etc. Moreover, some of these URLs exist only for a short term. The Hidden Service Locator (HSL) 115 of the present invention is configured to find these hidden URLs. In The Onion Router (TOR) network, for example, TOR relays enable anonymous surfing by multi stage encryption between the relays (nodes). A TOR Relay (TR) of the HSL 115 blends among the relays of the TOR network, as described for example in "Trawling for Tor Hidden Services: Detection, Measurement, Deanonymization" by Alex Biryukov, Ivan Pustogarov, Ralf-Philipp Weinmann from the University of Luxembourg (http://www.ieee-security.org/TC/SP2013/papers/4977a080.pdf). When URLs are routed through the TR, it keeps a record of them. These URLs are forwarded to the Crawler 110 via the Page Classifier and URL Filtering module 225 and the URL Repository 245.

The Structured Data Extractor 120 analyses html pages and extracts structural parameters such as dates, posts, comments, etc. These parameters assist in building a connection map and analyzing the data.

Figure 4:
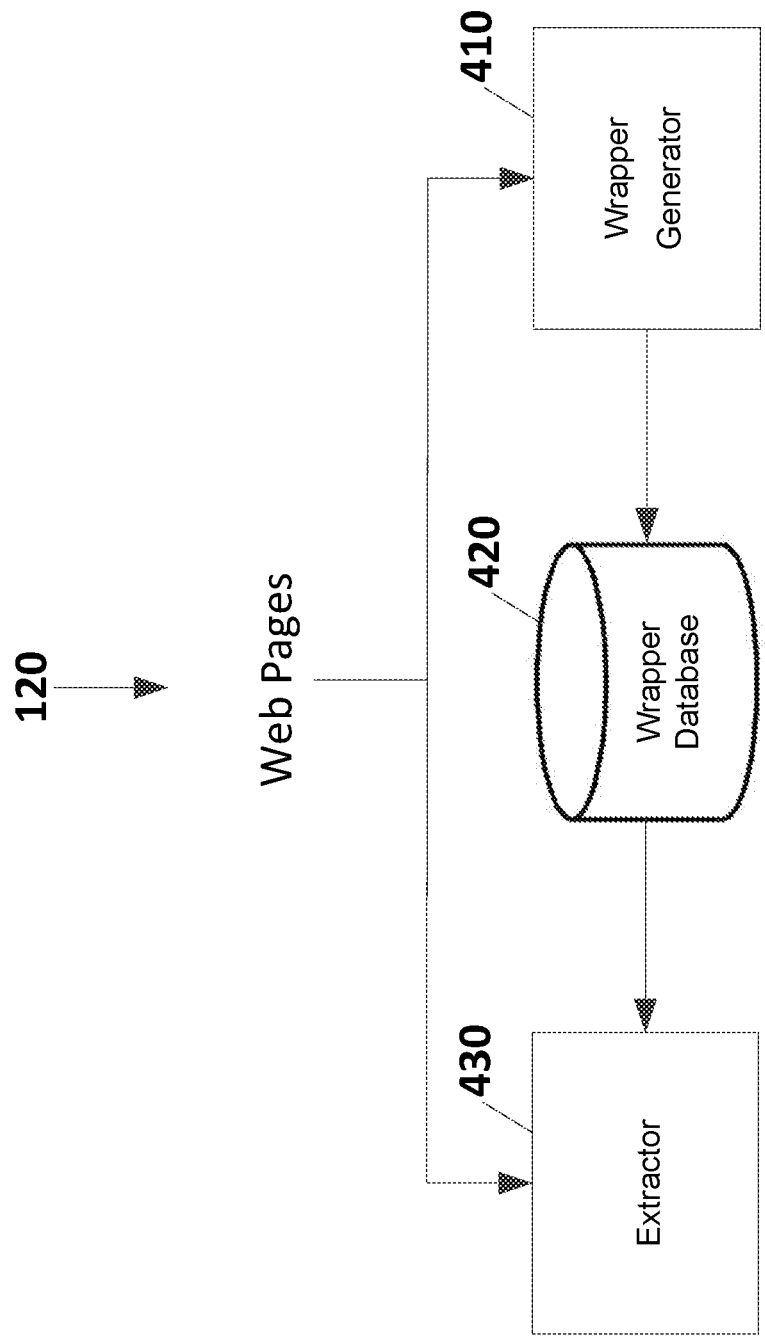

FIG. 4 is a schematic view of the Structured Data Extractor 120 of FIG. 1 according to embodiments of the present invention, comprising: a Wrapper Generator 410 such as described for example in http://www.aclweb.org/anthology/Y11-1010. The Wrapper Generator is connected with a Wrapper Database 420 which is connected with an Extractor 430. When a web page arrives from a certain domain (via the Crawler 110), if the domain is unrecognized, the page is forwarded to the Wrapper Generator 410. The Wrapper Generator 410 analyses the web page, finds patterns, creates a wrapper and saves it in the Wrapper DB 420. If the domain is recognized, the web page is forwarded to the Extractor 430. The Extractor 430 receives a web page and a suitable wrapper from the Wrapper DB and extracts the relevant data from the page according to labels defined by the wrapper, for example, a label which represents a date field.

The Text Search and Analytic Engine 130 enables advanced search in the Structured Data Database 125 and basic analysis such as, for example, in which date most of the comments were written, how many posts a surfer wrote for a specific search query, distribution of categories in a site, time line trending for a specific search query, top sites for a specific query, etc.

According to embodiments of the present invention, the system of the present invention may enable a client to receive prioritized search results. The results prioritization process, calculates the score of each search result based on the following criteria:
1. Source scoring—each source in the system gets a score based on the activity in the source and the value of the information it contains.
2. Recency—when was the information published (two days ago, two weeks ago, one year ago, etc.).
3. User reputation described below.
4. Record type scoring—for example, a post in a forum gets different score than a product in a market.
5. Search results relevance scoring as described, for example, in https://www.elastic.co/guide/en/elasticsearch/guide/current/scoring-theory.html.
6. Content analysis scoring—analyzing text in order to determine whether it is a code, a single word, free language, etc. where free language receives a higher score.

The Knowledge Deduction Service 135 deeply analyses the data, namely, extracts insights regarding dark web surfers behavioral patterns and interactions. For example, finds the surfers who have the highest reputation and monitors their activities; monitors surfers' activity hours, social connections, group dynamics, etc. Using the Knowledge Deduction Service 135 it is possible to provide alerts, built from various pieces of data which are not necessarily directly connected to each other.

Figure 5:
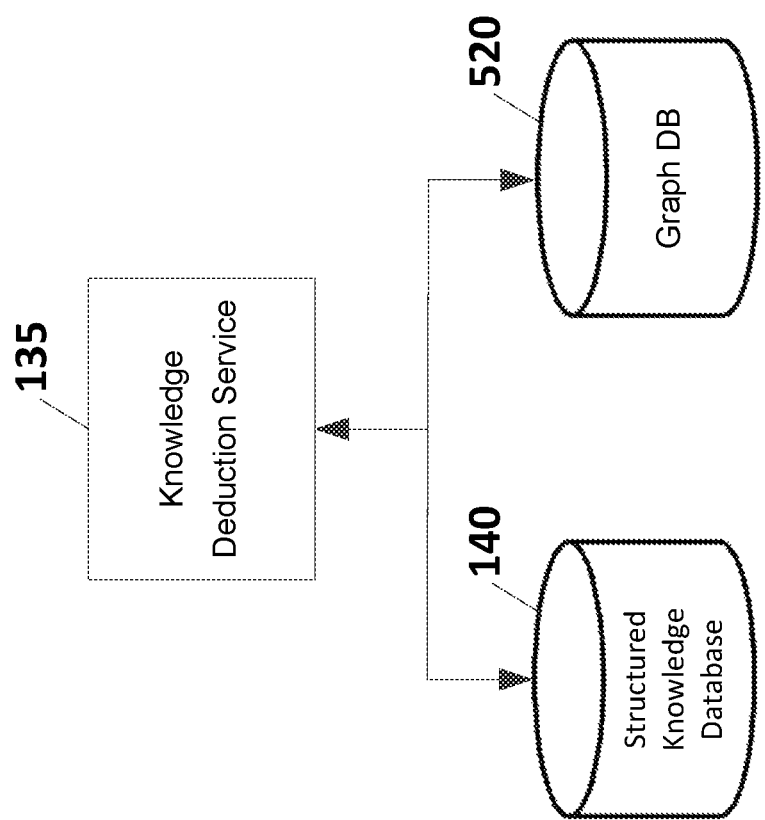

FIG. 5 is a schematic view of the data sources connected with the Knowledge Deduction Service 135 of FIG. 1, comprising the Structured Knowledge Database 140 and a Graph DB 520. The Knowledge Database 140 stores information which was concluded during the data analysis (analysis results). The Graph DB 520 stores the connections between entities.

Reputation Evaluation

Figure 6:
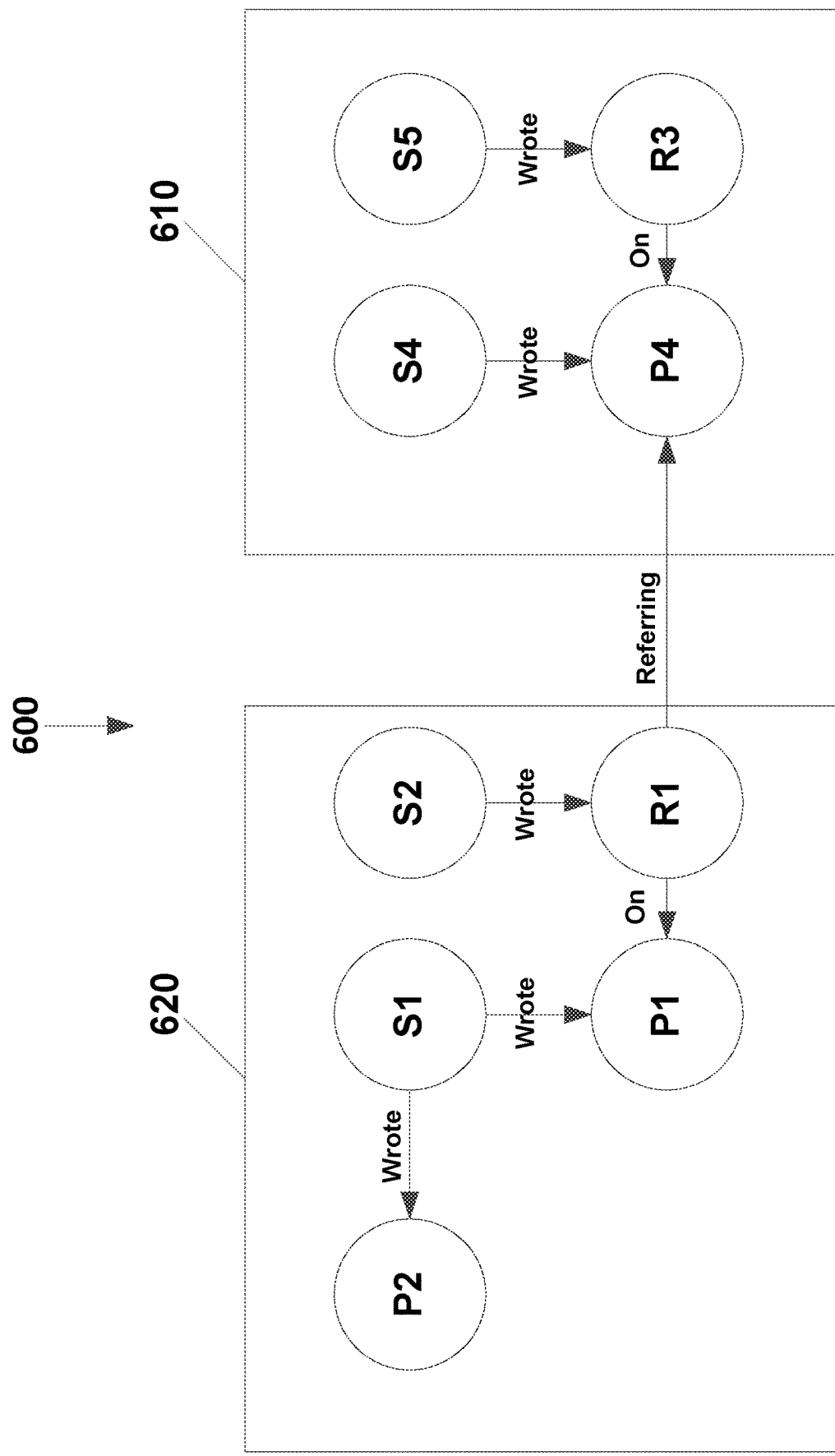

FIG. 6 represents a graph 600 of two forums, 610 and 620, connected via a "Referring" from one forum (620) to the other (610). In the circles (nodes): S represents a surfer, P represents a post and R represents a response. On the lines between the circles (edges): Wrote represents—a surfer who writes a post or a comment, On represents—a surfer who responds to a post and Referring represents—a post or a comment which refers to another post or a comment.

Prior to the reputation evaluation process, the Knowledge Deduction Service 135:
1. Classifies each post to its relevant category, for example, Hacking, Programming, Carding, Anonymity, etc. The classification and categorization is based on standard methods such as for example, Support Vector Machine (SVM), Bayesian, Neural Network, etc.
2. Analyzes the comments and determines the sentiment value of each comment. The sentiment value ranges from −1 to +1, where +1 represents positive sentiment, −1 represents negative sentiment and 0 represents neutral sentiment. The determination may be done based on statistical calculations, on NLP (Natural Language Programming) methods and the like.

Figure 7:
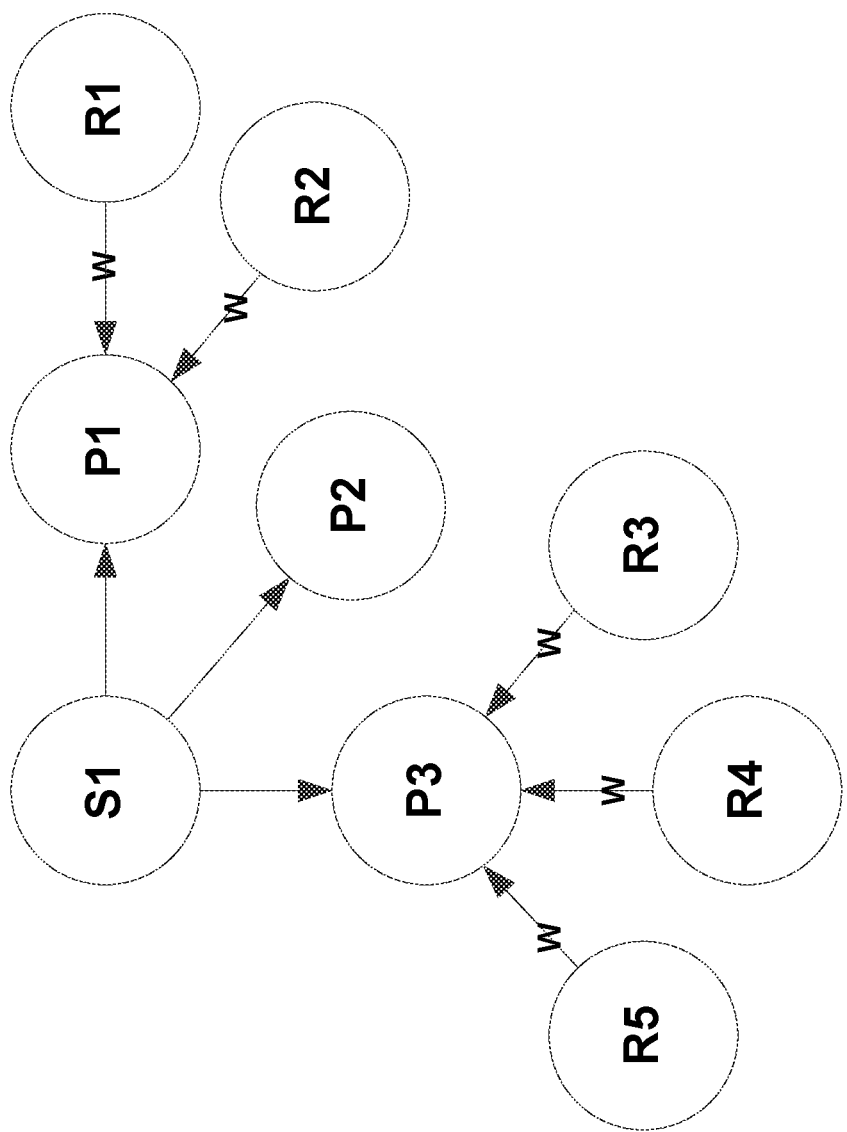

FIG. 7 shows an exemplary surfer S1 who wrote three posts (P1, P2 and P3) where P1 has two responses and P3 has three responses. W represents the sentiment of each response.

According to embodiments of the invention, the reputation evaluation is performed according to the exemplary following formulas:

$$\text{When } Qp \neq \emptyset: R(p) = \langle \{S(q) | q \text{ in } Qp\} \rangle *^4\sqrt{|Qp|}$$

$$\text{When } Qp = \emptyset: R(p) = R0$$

$$\text{When } Pu \neq \emptyset: R(u) = \langle \{R(p) | p \text{ in } Pu\} \rangle *^4\sqrt{|Qp|}$$

$$\text{When } Pu = \emptyset: R(u) = 0$$

where:
u=user
p=post
Pu=user post list
Qp=post comments list, not including the user comments on its own post.
R(p)=post reputation
R(u)=user reputation
S(q)=sentiment of comment q (where −1≤S(q)≤1)
R0=reputation of a post with no comments
⟨G⟩=the average value of G
|G|=the number of members in G Fields of Interest In order to monitor a surfer's fields of interest the Text Search & Analytic Engine 130 summarizes the number of surfer's posts in each category.

Figure 8:
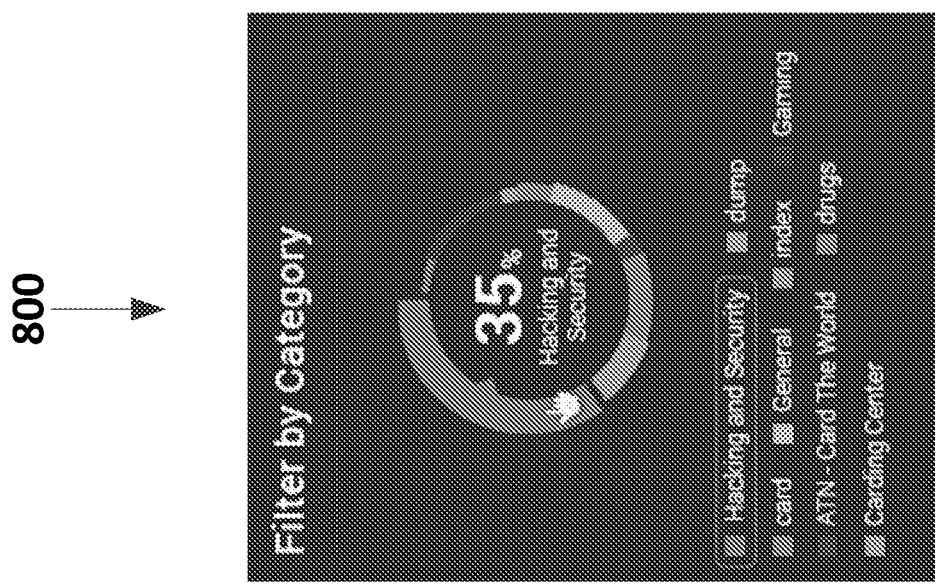

FIG. 8 shows an exemplary representation 800 of the fields of interest of an exemplary surfer.

Group Identification

The group identification process includes two steps:
1. The Knowledge Deduction Service 135 monitors the number of interactions between surfers. The strength of the connection is determined according to the number of interactions between surfers versus a predetermined threshold.
2. The Knowledge Deduction Service 135 finds the groups that have more than a predetermined number of interactions.

Figure 9A:
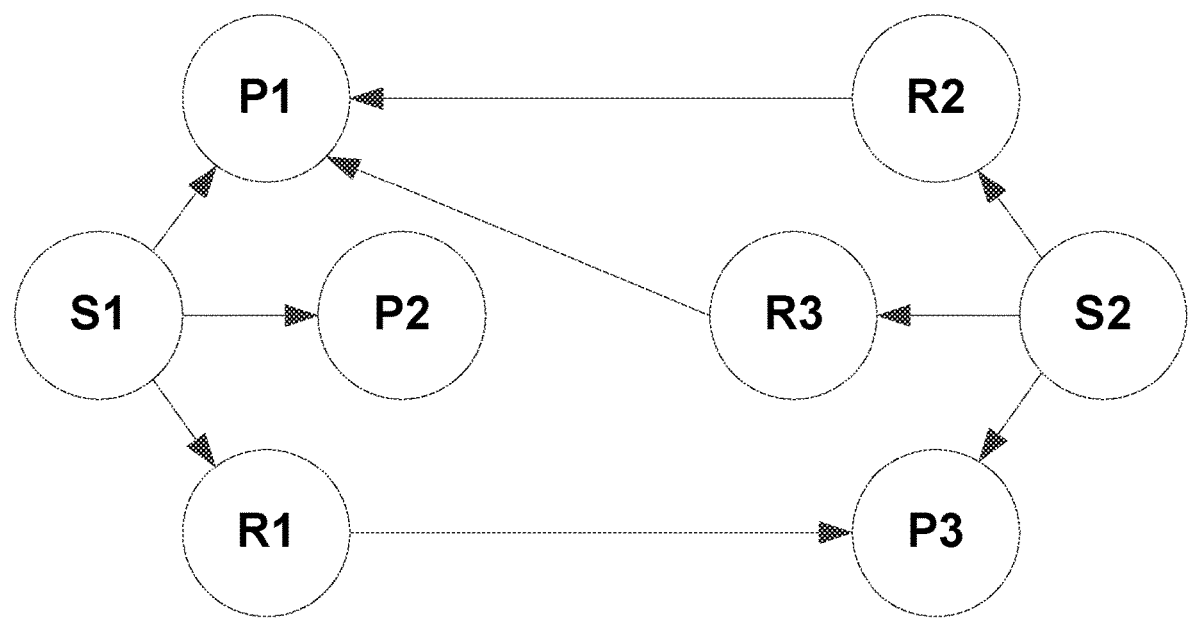

FIG. 9A shows an exemplary graph representing the interactions between surfer S1 and surfer S2.

Figure 9B:
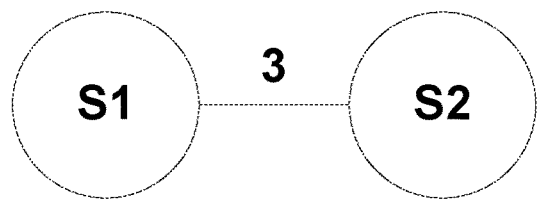

FIG. 9B shows an exemplary graph representing the total number of interactions between surfer S1 and surfer S2.

Figure 10:
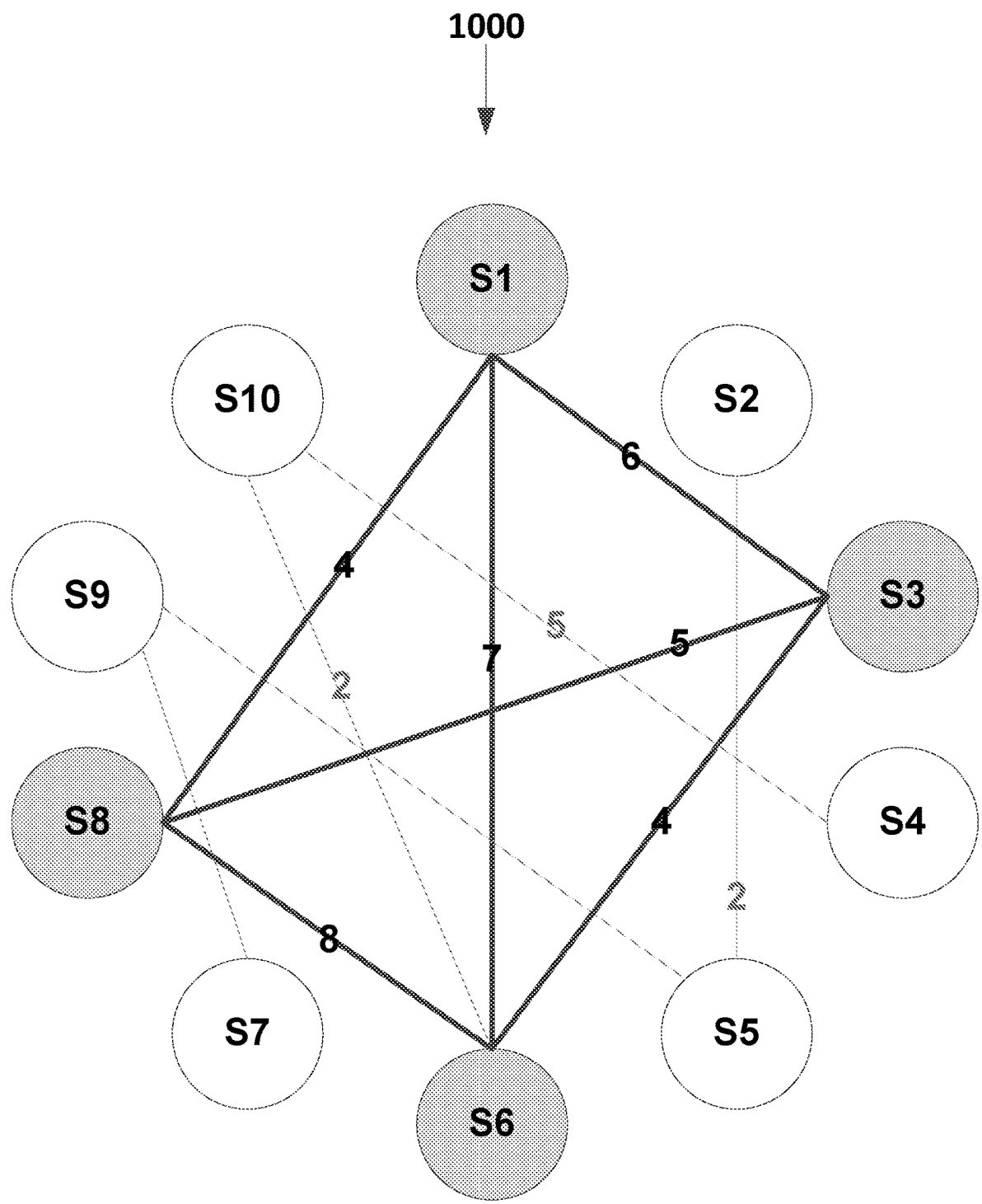

FIG. 10 shows an exemplary interactions graph 1000 where the groups that have at least four interactions are highlighted.

Activity Times Analysis

The activity times analysis enables the system to monitor the behavior of surfers, whether they are "full time" surfers, amateurs, night surfers, etc. Moreover, it may provide indication on the location of the surfers.

In order to perform the activity times analysis the Knowledge Deduction Service 135:
1. Calculates the temporal data distribution within a time frame of e.g. 24 hours or 7 days.
2. Saves the time frame which includes most of the data.
3. Saves the average and the standard deviation of the temporal data distribution.

FIG. 11 shows an exemplary data distribution graph 1100 represented by the number of activities (e.g. posts) in each hour.

FIG. 11A shows another exemplary data distribution graph 1100A using a matrix of 24×7 (hours×days). Each cell represents the sum of the number of records (in term of the hour and day), for example, on Sunday at 10 AM four posts were written. The data is normalized to a range of 0-5 by, for example, the following formula:

$$\text{Ceil}(\log 4(x+1))$$

where X is the sum of records in one cell.

Surfer's Identity Matching

The surfer's identity matching process enables to find surfers who use different aliases (nicknames).

In order to find such surfers the Knowledge Deduction Service 135 may:
1. Locate communication information (e.g. email, ICQ, jabber, etc.) and locate other identities that are using the same communication information. To achieve that, the system detects a false matching (such as a reference to communication information by another surfer) by using machine learning techniques.
2. Look for similar aliases excluding common names (e.g. guest, anonymous).
3. Locate surfers with similar activity pattern using the activity times analysis.
4. Locate surfers with similar fields of interest.
5. Locate surfers who are active for a certain period and then continue the activity in other places/other aliases. For example, a surfer was active from the first of November until the end of the month and then active in another place/with other aliases from the first of December.
6. Locate surfers who post the same content at the same time in two different locations.
7. Count the most frequent words used by a surfer (excluding stop words and other common words).
8. Analyze the surfer's text, the use of punctuation marks, upper/lower case, common misspelling, etc.

Surfers Profile Characterization

The surfer profile characterization is the adjusted calculation of the reputation evaluation, the fields of interest monitoring, the group identification and the activity times analysis of the surfer across multiple sources and aliases.

The Alerts Service 145 of the present invention is a unique tool providing prioritized alerts to clients who use the system of the present invention via various media such as e-mail, Short Message Service (SMS), standard cyber threat intelligent format (STIX), etc. The alerts may be generated based on the client's preferences, for example, when a certain word, in a certain field, written by a certain surfer is monitored. The system of the present invention may be integrated in the client's alerts system in order to strengthen the client's alerts capabilities.

FIG. 12 is a schematic view of the Alert Service 145 of FIG. 1 components according to embodiments of the present invention, comprising a Scheduler 1210 which Schedules the monitoring process related to each alert, an Alert Engine 1220 which sends alerts (e.g. via e-mail 1222, SMS 1224 and STIX 1226) according to rules written in the Alert Rules DB 1230 and prioritizes them according to the processed data stored in the Structured Knowledge Database 140; and an Alert Rule module 1260.

The Scheduler 1210 wakes up once in a while according to predetermined time periods configured in the Alert Rules DB 1230. The Alert Engine 1220 analyzes the rules it has to perform according to the rules written in the Alert Rules DB 1230, scans the data stored in the Text Search and Analytic Engine (130 of FIG. 1) and the Structured Knowledge Database 140 accordingly, prioritizes the alerts as described below and sends alerts accordingly.

The Alert Rule module 1260 defines the wake up intervals, enables search by a key word, an activity related to a certain surfer, an activity of a certain group, a change in trend of a certain key word, a new phrase or a word that appears more than a predetermined number of times, a combination of the above, etc.

FIG. 13 shows an exemplary user interface 1300 for creating an alert. According to embodiments of the invention the user may define key words, the name of the alert, the importance level of the alert, the addressees of the alert and the frequency of alerting.

It will be appreciated that the present invention is not limited to the above exemplary definitions.

Alerts Prioritization

According to embodiments of the invention, an alert prioritization process, performed by the Alert Engine, may calculate the score of each alert based on the following criteria:
1. Source scoring—each source in the system gets a score based on the activity in the source and the value of the information it contains.
2. Recency—when was the information published (two days ago, two weeks ago, one year ago, etc.).
3. User reputation described above.
4. Record type scoring—for example, a post in a forum gets different score than a product in a market.
5. Search results relevance scoring as described, for example, in https://www.elastic.co/guide/en/elasticsearch/guide/current/scoring-theory.html.
6. Content analysis scoring—analyzing text in order to determine whether it is a code, a single word, a free language, etc. where free language receives a higher score.

Alternatively or additionally, the alert prioritization process may use the results of the search prioritization process described above.

An Analytical Dashboard of the present invention enables to view the data analysis described above. The Analytical Dashboard may comprise categories, number of posts by dates, search results, an option to create an alert from this search, the total number of search results, etc.

A surfer Analytic Dashboard of the present invention enables to view data analysis of a certain surfer, comprising the surfer's details, his activity analysis, number of posts by dates, categories, his connection map, etc.

According to embodiments of the present invention, the system of the present invention may further comprise a case management module enabling a client of the system to create a case file in order to manage a research or an investigation by adding posts, surfers and alerts notifications.

According to embodiments of the present invention, the system 100 may further comprise a recommendation engine which may recommend adding relevant surfers, posts, etc. to the case file, for example, by building a connection map of the existing surfers in the case file, analyzing the connections and recommending adding surfers that have a strong connection with the existing surfers in the case file.

According to embodiments of the present invention, the recommendation engine may recommend adding to the case file:
1. "Similar" surfers based on the Surfer's identity matching described above.
2. Surfers that published the posts collected in the case file.
3. Surfers that are mentioned in the existing posts' content.
4. Surfers having similar fields of interest based on the classifications made by the Knowledge Deduction Service.
5. Posts that have a strong contextual matching, for example:
   a. Same classification made by the Knowledge Deduction Service.
   b. Same time in the time range of the posts in the case file.
   c. Posts having a words-matching up to a certain threshold, etc.

It will be appreciated that the term "post" may be interpreted as any content distribution such as, publications, chats, content written by surfers, a product for sale, etc.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. A method of providing searchable database and prioritized search user interface for exploring dark web content and surfer activity, comprising:
   employing at least one crawling process connected to a network relay and to a repository configured for storage of data, the at least one crawling process being configured for obtaining data of dark web content of a plurality of web pages and sites scanned and collected using a plurality of hidden uniform resource locators stored in the repository responsive to extraction thereof from at least one of the plurality of web pages, classification and filtering of unwanted or unnecessary uniform resource locators;
   extracting from the data of dark web content and storing in a structural database a plurality of structural parameters;
   analyzing data of dark web content in the structural database, using an analysis process configured to determine at least one statistic of dark web content of the plurality of web pages, and using a knowledge deduction process configured for employing machine learning to determine at least one profile characterization of at least one dark web surfer based on engagement by the at least one dark web surfer with dark web content of the plurality of web pages, which engagement being comprised in the dark web content of the plurality of web pages, and storing the at least one profile characterization in a knowledge database, wherein the at least one profile characterization of a respective dark web surfer relates to at least one of a behavioral pattern of the respective dark web surfer and an interaction of the respective dark web surfer with another dark web surfer;
   responsive to a query submitted, obtaining one or more results matching the query using the structural database and at least one of the at least one statistic and the knowledge database;
   determining prioritization of the one or more results using a score calculated for each of the one or more results according to a set of defined criteria comprising at least a user reputation criterion representing a measure of engagement by others with dark web content of a respective one of the at least one dark web surfer; and
   providing over a communication network to at least one computing device an output of the one or more results according to the prioritization.

2. The method of claim 1, wherein the set of defined criteria further comprising at least one of: source scoring; recency; record type scoring; search result relevance scoring; and content analysis scoring.

3. The method of claim 1, wherein the at least one statistic comprising at least one of: date in which most of comments were written, number of posts a surfer wrote for a specific search query, distribution of categories in a site, time line trending for a specific search query and top sites for a specific query.

4. The method of claim 1, wherein determination of the at least one profile characterization by the knowledge deduction process comprising at least one of: analyzing sentiment of comments on posts to calculate reputation evaluation; classifying posts into categories and summing posts in each category to determine fields of interest; monitoring a number of interactions between surfers and identifying groups having a number of interactions above a predetermined threshold; and analyzing activity times.

5. The method of claim 4, wherein analyzing activity times comprising: calculating a temporal data distribution within a time frame; storing time frame which includes most data; and storing an average and a standard deviation of the temporal data distribution.

6. The method of claim 1, wherein the knowledge deduction process being further configured for identifying usage of different aliases by the at least one surfer using identity matching process.

7. The method of claim 6, wherein the identity matching process comprising at least one of:
   locating communication information used by more than one surfer;
   looking for similar aliases excluding common names;
   locating surfers with similar activity pattern using activity times analysis;
   locating surfers with similar fields of interest;
   locating surfers who are active for a certain period and continue being active in other places or by other aliases;
   locating surfers who post a same content at a same time in different locations;
   counting most frequent words used by a surfer; and
   analyzing surfers' text.

8. The method of claim 1, further comprising sending prioritized alerts according to rules defined and stored in an alert rules database responsive to the query being submitted within monitoring process scheduled with relation to at least one alert.

9. The method of claim 8, wherein the alert rules database comprising at least one rule selected from the group consisting of: define wake up intervals for scheduling of each monitoring process, enable search by a key word, enable search by an activity related to a certain surfer, enable search by an activity of a certain group, enable search by a change in trend of a certain key word and enable search by a new phrase or a word that appears more than a predetermined number of times.

10. The method of claim 1, further comprising providing case management interface configured to enable a user to create a case file in order to manage a research or an investigation.

11. The method of claim 10, further comprising providing recommendation on adding relevant surfers and/or posts to the case file.

12. The method of claim 11, wherein the recommendation being provided according to at least one of: building a connection map of existing surfers in the case file, analyzing connections in the connection map and recommending adding surfers that have a strong connection with existing surfers in the case file; identity matching based similar surfers; surfers that published posts collected in the case file; surfers that are mentioned in existing posts' content; surfers having similar fields of interest; and posts that have a strong contextual matching comprising at least one of same classification, same time in a time range of posts in the case file and posts having a words-matching up to a certain threshold.

13. The method of claim 1, further comprising providing analytical dashboard to enable view of data analysis comprising at least one of categories, number of posts by dates, search results, an option to create an alert from a search, a total number of search results, surfer details, surfer activity analysis, surfer number of posts by dates, surfer categories and surfer connection map.

14. The method of claim 1, wherein said employing at least one crawling process comprising managing an Internet Protocol address of the at least one crawling process by at least one of hiding the Internet Protocol address and changing the Internet Protocol address, progressing from one web page to another using extracted links found in each web page, classifying web pages extracted and controlling operation timing and pace of data collection.

15. The method of claim 14, wherein said employing at least one crawling process further comprising optimizing scanning pace versus secrecy thereof.

16. The method of claim 1, wherein the at least one profile characterization comprising reputation evaluation performed using formulas (I) and (II), wherein:

$$R(p) = \begin{cases} \langle \{S(q) | q \text{ in } Qp\} \rangle * \sqrt[4]{|Qp|} & \text{when } Qp \neq \emptyset \\ R0 & \text{when } Qp = \emptyset \end{cases} \quad \text{(I)}$$

$$R(u) = \begin{cases} \langle \{R(p) | p \text{ in } Pu\} \rangle * \sqrt[4]{|Pu|} & \text{when } Pu \neq \emptyset \\ 0 & \text{when } Pu = \emptyset \end{cases} \quad \text{(II)}$$

and wherein:
- u=user;
- p=post;
- Pu=user post list;
- Qp=post comments list, not including a user comments on its own post;
- R(p)=post reputation;
- R(u)=user reputation;
- S(q)=sentiment of comment q, where $-1 \leq S(q) \leq 1$;
- R0=reputation of a post with no comments;
- $\langle G \rangle$ =average value of G;
- |G|=number of members in G.

* * * * *